Feb. 22, 1938.   F. W. THOROLD   2,109,121
METHOD AND APPARATUS FOR GRADING PARTICLES DIFFERING IN SPECIFIC GRAVITY
Filed Dec. 22, 1933   2 Sheets-Sheet 1

Inventor:
F. W. Thorold

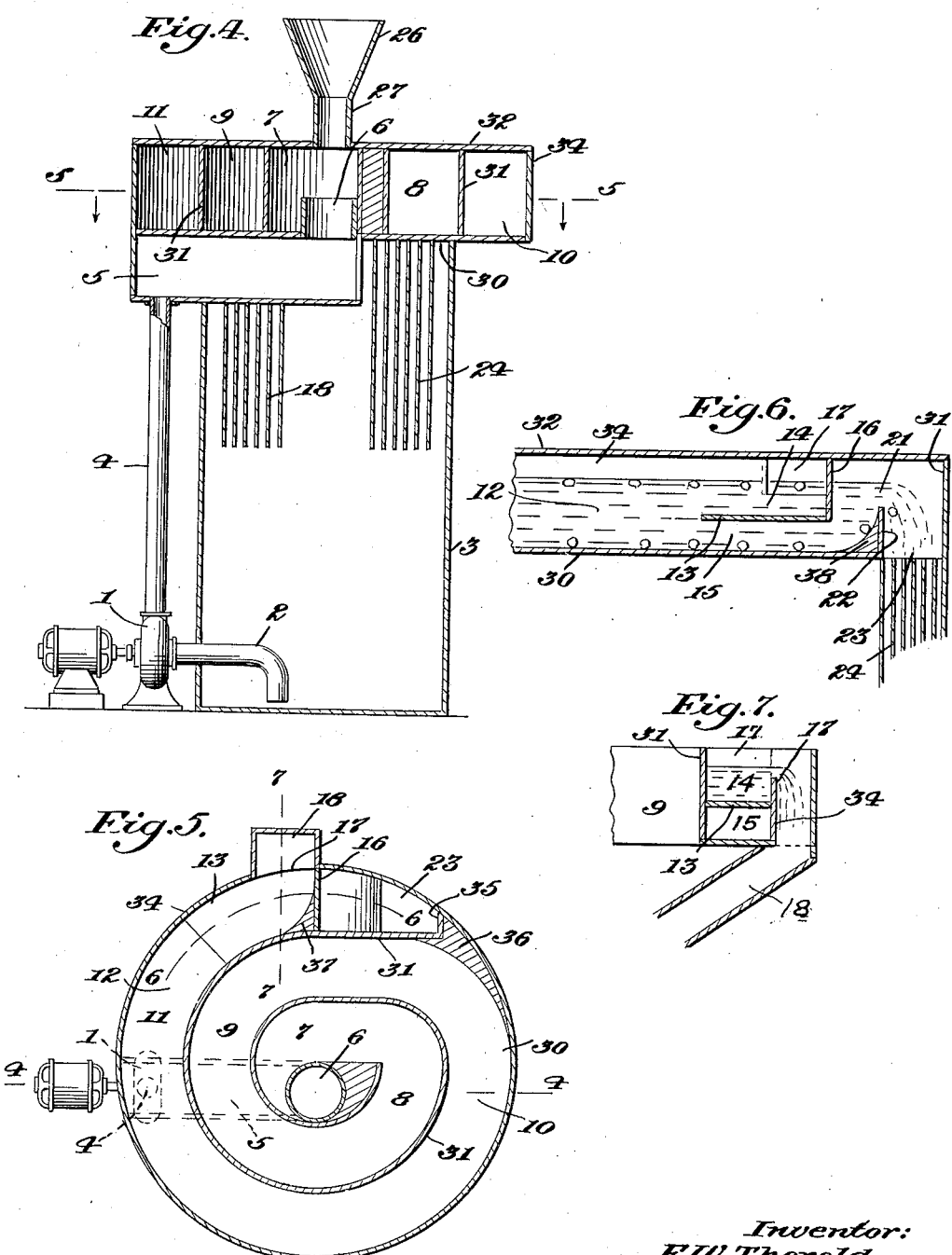

:::
Patented Feb. 22, 1938

2,109,121

UNITED STATES PATENT OFFICE 2,109,121

METHOD AND APPARATUS FOR GRADING PARTICLES DIFFERING IN SPECIFIC GRAVITY

Frederick Walter Thorold, Niagara Falls, N. Y., assignor to Chisholm-Ryder Co., Inc., Niagara Falls, N. Y.

Application December 22, 1933, Serial No. 703,627

14 Claims. (Cl. 209—156)

My invention relates to methods and means for separating a mixture of articles of different specific gravities into groups or grades of articles having more nearly equal specific gravity and relates particularly to apparatus wherein the separation is accomplished by gravity acting on the article when placed in a liquid having greater specific gravity than some of the articles and lesser specific gravity than others. While my invention is adapted and intended for use in grading green peas in accordance with their specific gravities, it is not limited to this use but may be used for grading other articles in accordance with their specific gravity.

Articles impervious to the liquid in which they are placed to separate will, if left in the liquid, ultimately reach either the surface or the bottom of the liquid, provided the liquid is free from cross currents, swirls, and eddies sufficient to overcome the force of gravity acting vertically downward on the article.

When green peas are the articles to be separated and salt brine is the liquid used, an entirely different condition exists. Green peas, and more especially the tender peas, quickly absorb brine. This not only permanently injures the quality of the pea but changes its specific gravity. A very small change in the specific gravity of any pea is sufficient to change its classification. For instance, peas which float in brine having a specific gravity of 1.075 are frequently referred to as "fancy" quality and bring the highest price. Peas which sink in this brine bring a lower price. Peas which float in a brine having a specific gravity of 1.085 are called "standard" quality and the peas which sink in this brine are "sub-standard" quality and bring a much lower price. It is, therefore, essential that the peas should not be long enough in the brine to have their specific gravity altered. Most of the graders now on the market allow many of the peas to remain so long in the brine that the quality of the pea is injured and because of the change in its specific gravity it is wrongly graded. This means a loss to the farmer and a loss to the canner.

It is generally assumed that either stagnant or slow moving brine is the first requisite of a pea grader, the object being to have the brine free from cross currents, swirls and eddies which interfere with the action of gravity on the pea. For this reason the tanks are made quite deep and of large cross sectional area. However, no matter how much care is taken in putting the peas into the brine, these cross currents, eddies and swirls are created.

Where manual, mechanical or hydraulic means are used to remove the peas from the surface and bottom of the brine, other cross currents, eddies and swirls are created in the brine all interfering with the action of gravity on the pea and making it necessary to keep the pea for a longer time in the brine.

Bubbles of air become attached to the peas when they are put into the tank and many of these are large enough to completely offset the force of gravity and because of the slow movement through the brine, these bubbles of air remain attached to the pea causing it be wrongly graded.

An entirely different principle is used in my method and apparatus. Since it is the force of gravity which causes the peas to float or sink in the brine and this force acts in a vertical direction, no other vertical force or vertical component of a force must act on any pea. I, therefore, compel all other forces in the brine to act in a horizontal direction.

To accomplish this, I use the channel to carry the brine, the length of the channel being many times its width and depth. The channel is laid on a grade which will produce in it what is known as a self-cleansing or scouring velocity or a velocity greater than the critical velocity. A head is provided to produce this velocity. I prefer that a short length of the channel at its upper or inlet end be laid on an even steeper grade than the balance of the channel. The brine is fed into the channel at its upper end. The peas are dumped or dropped into the swiftly moving brine at the upper end of the channel. Immediately cross currents, eddies and swirls are created in the brine at this point and these twist and whirl the peas around thoroughly wetting every pea and washing off the air bubbles. The superior force of the swiftly moving brine carries all the peas and the cross currents, eddies and swirls down the channel and in a short distance every force in the now smoothly flowing brine is acting in a horizontal direction except the force of gravity and it is acting unmolested on each pea in a vertical direction. At the lower end of the channel, I divide the horizontally flowing strata of the stream into two or more streams, one over the other, and discharge these separately over screens. The brine flows to a tank and is again circulated through the system.

The three outstanding reasons why the peas are correctly graded by this method and why no pea is in the brine long enough to injure its quality or change its specific gravity are:

(1) Owing to the absence of cross currents, eddies and swirls, the full force of gravity acts on each pea.

(2) Because of the shallowness of the channel, no pea has to move very far in a vertical direction to be carried into its proper outlet channel.

(3) The channel may be long enough to give every pea ample time to rise or sink in the brine without appreciably increasing the time the pea is in the brine.

With the above mentioned objects in view, my invention consists of the method, construction and combination of elements hereinafter described and claimed.

Referring to the drawings:

Figure 4 is a vertical sectional view on line 4—4 of Figure 5.

Figure 5 is a horizontal sectional view on line 5—5 of Figure 4.

Figure 7 is a cross sectional view on line 7—7 of Figure 5.

Figure 8 is a cross sectional view of the spiral channel similar to Figure 7, but showing the bottom of the channel lower at each turn of the spiral so as to produce a sloping stream.

Figure 1:
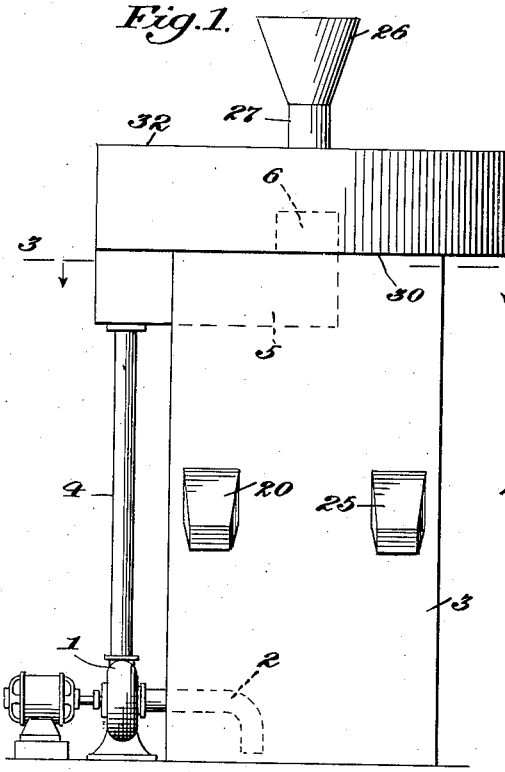
Figure 1 is a front view in elevation of a pea grader embodying my invention.
Figure 2:
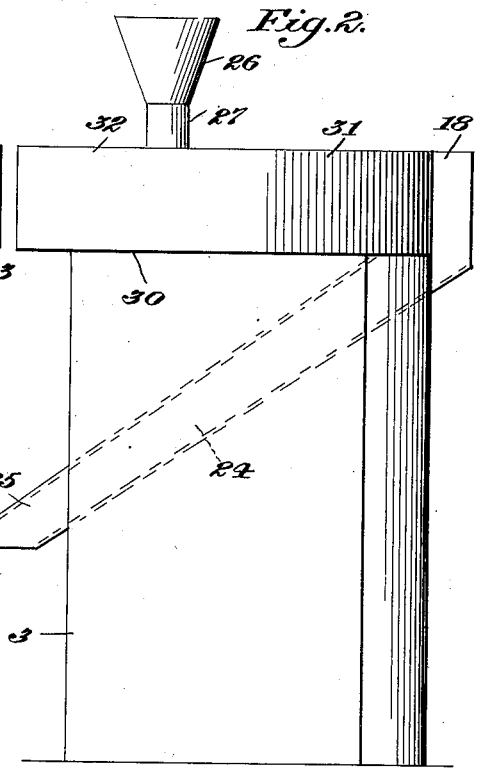
Figure 2 is a side view of the same.
Figure 3:
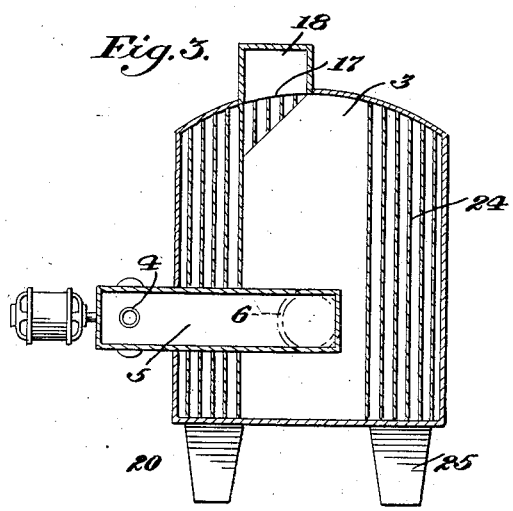
Figure 3 is a horizontal sectional view on line 3—3 of Figure 1.
Figure 6:
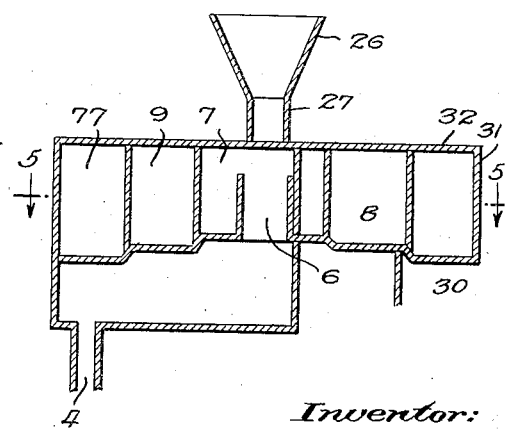
Figure 6 is a vertical sectional view on line 6—6 of Figure 5.

In the drawings 1 indicates a circulating pump here shown as driven by an electric motor and having its intake pipe 2 leading from brine tank 3 here shown as vertical tank closed at its upper end by circular plate 30 of somewhat greater area than that of the main portion of the brine tank, and having at its periphery upwardly extending cylinder 34. Extending radially inward beneath top plate 30 is a pipe 5 having its outer end outside tank 3 and having at its inner end pipe 6 open at its end and extending a short distance above top plate 30. Into the under side of the portion of pipe 5 outside the tank extends pipe 4 leading from the outlet of pump 1. Extending upward from top plate 30 is a vertical strip 31, secured at one end to pipe 6 and extending in a spiral about pipe 6 as a centre and having its outer end secured to cylinder 34 at 35 so as to form a continuous channel 7, 8, 9, 10, 11 and 12, from pipe 6 to stop plate 16.

Operating of pump 1 will draw liquid from brine tank 3 and force it up pipe 4 into horizontal pipe 5 and vertical pipe 6, from which it overflows into portion 7 of the channel and follows around through spiral passage 8, 9, 10, 11, and 12.

Extending into end portion 12 of the spiral channel from the lower edge of stop plate 16 is horizontal plate 13 parallel with top plate 30 and at such distance above it as to form an upper passage 14 and a lower passage 15 of nearly equal size. Passage 14 leads to stop plate 16 by which the portion of the liquid carried through it is diverted through weir opening 17 in cylinder 34 into inclined delivery pipe 18 which leads downward through brine tank 3 to discharge spout 20.

Lower passage 15 leads beneath the lower edge of stop plate 16 to stop plate 22, the upper edge of which forms a weir leaving above it an opening 21 which leads to opening 23 in top plate 30 which, in turn, leads to inclined delivery pipe 24 which extends through brine tank to discharge spout 25. The delivery pipes 18 and 24 are formed of screen material or are otherwise so constructed as to permit the liquid carried into them to drain back into the brine tank.

The spiral channel is preferably covered by plate 32. Supported by plate 32 or otherwise supported directly above and concentric with pipe 6 is a short inlet pipe 27 on which is carried a hopper 26.

In operation brine tank 3 is filled with brine of suitable specific gravity up to a level somewhat below the lower ends of the inclined pipes 18 and 24, and circulating pump 1 is started forcing the brine up through pipes 4 and 5 and causing it to overflow from the upper end of 6 into the spiral channel through which it circulates and returns to the brine tank through pipes 18 and 24, the stream being divided into an upper and a lower stream by plate 13. The circulating pump is so regulated as to cause the brine in the spiral channel to move at a self-cleansing velocity. In cases where it is desired to keep the flow of the brine in the channel constant, the bottom of said channel is laid at a grade to produce the desired self-cleansing velocity. A speed of movement of one foot per second for a distance of thirty feet has been found satisfactory for this purpose, but this speed and distance may be varied.

The peas, or other articles in mixture containing articles differing in specific gravity, are allowed to drop through inlet pipe 27 into the upwardly moving brine as it overflows from the end of pipe 6 and are carried forward with the brine flowing through the spiral channel. As the mixture of peas or other articles passes along the spiral channel, the peas or other articles of less specific gravity than the brine will approach the surface and those of greater specific gravity will approach the plate 30 which forms the bottom of the channel and as plate 13 is reached the articles of less specific gravity than the brine will pass above plate 13 and through opening 17 and pipe 18 and will be delivered from spout 20 while the articles of greater specific gravity than the brine will pass beneath plate 13 and through passage 21 and pipe 24, and will be delivered at spout 25.

In order that the spiral channel may be of uniform width throughout, it is necessary to supply filling 36 at the end of spiral strip 31 and filling in material 37 at the junction of stop plate 16 with strip 31, also filling in material 38 at the junction of stop plate 22, with top plate 30.

The arrangement of the channel through which the brine flows carrying with it the peas, or other articles to be assorted, in a spiral is desirable as saving floor space, but the channel may be straight or other than spiral if preferred, and may be either open or closed, it being essential only that the channel, from the point at which the peas, or other articles, enter it to the point at which they reach the horizontal plate 13, shall be adapted to permit free flow and shall be of such area, grade and length to afford sufficient time for the peas of lesser specific gravity to rise and those of greater specific gravity to sink in brine of the specific gravity used, but should not be of such length as to permit absorption of brine by the peas.

If it is desired to separate out one or more intermediate grades of peas, horizontal plates corresponding to horizontal plate 13, arranged at various heights from the top plate 30 may be used.

Having thus described my invention, what I claim is:—

1. In apparatus for separating articles of different specific gravity from a mixture of articles, a tank adapted to contain liquid, a circular top plate for the tank, a pipe extending horizontally inward beneath the top plate, a delivery pipe extending from said pipe through the top plate, a cylinder extending upward from the periphery of the top plate, a strip secured at its lower edge to the top plate and extending in a spiral from the upwardly extending delivery pipe to form with the cylinder at the periphery of the top plate a continuous channel of uniform size, a horizontal plate in said channel at its outlet end above the parallel with the top plate dividing the channel into an upper and a lower passage, means for conducting liquid from the outlet end of the channel back to the tank, means for causing liquid to circulate from the tank through the channel and back to the tank, and means for supplying articles to be separated arranged to deliver the articles downward in line with the delivery pipe onto the column of liquid discharged from it.

2. In apparatus for separating articles of different specific gravity from a mixture of articles, a mixture of articles, a tank adapted to contain liquid, a circular top plate for the tank, a pipe extending horizontally inward beneath the top plate, a delivery pipe extending from said pipe through the top plate, a cylinder extending upward from the periphery of the top plate, a strip secured at its lower edge to the top plate and extending in a spiral from the upwardly extending delivery pipe to form with the cylinder at the periphery of the top plate a continuous channel of uniform width, a horizontal plate in said channel at its outlet end above and parallel with the top plate dividing the channel into an upper and a lower passage, means for conducting liquid from the outlet end of the channel back to the tank, means for supplying articles to be separated arranged to deliver the articles downward in line with the delivery pipe onto the column of liquid discharged from it and a circulating pump having its inlet in communication with the lower portion of the tank and having its discharge connected with the inwardly extending leading to the upwardly extending delivery pipe.

3. In apparatus for separating articles of different specific gravity from a mixture of articles, a channel of length many times its width or depth constructed in the form of a spiral from a vertical delivery pipe at one end of the spiral to a plurality of outlets at the other end of the spiral channel, means for dividing the outlet end of the channel into three channels superimposed one over the other, each channel communicating with one of the three outlets, means to carry the liquid discharged from said outlets to a tank adapted to hold liquid, a circulating pump with suction pipe into said tank and discharge pipe into the delivery pipe at the inlet end of the spiral channel with means for operating same, means to introduce the articles to be separated into liquid flowing from the vertical delivery pipe and means to cause the liquid to flow in the spiral channel in parallel strata at a self-cleansing velocity.

4. The method of grading peas or the like which consists in supplying liquid to a channel in such volume and at such speed as to produce turbulence, introducing peas of mixed quality into the turbulent portion of said stream, carrying the mixture of liquid and peas swiftly through the channel for such distance as will eliminate the objectionable eddies and swirls to thereby produce horizontal strata in the stream carrying peas, thereafter carrying the mixture of liquid and peas swiftly through the channel for such further distance as will permit rising of the floaters and sinking of the others, subsequently dividing the flowing stream into upper and lower portions to segregate the floaters and sinkers from each other and discharging the stream divisions carrying the separated materials separately.

5. The method of separating articles into groups in accordance with their specific gravity which consists of agitating the articles with many times their volume of liquid of greater specific gravity than some of the articles and then carrying the mixture of articles and liquid in a channel having a length many times its width for such distance as will cause the liquid to flow in parallel and subsequently horizontal strata free from eddies and swirls, and continuing the flow of the eddyless stream in a channel having a length many times its width for such distance as will enable the articles to separate into floaters and sinkers and subsequently dividing the flowing stream into two or more superimposed streams and discharging the same.

6. The method of separating granular particles into grades in accordance with the relation between their specific gravities and that of a transporting liquid, which consists in maintaining a constant supply of liquid of such volume and at such speed as to produce a condition of turbulence, said liquid being of such specific gravity relative to that of the particles to be graded that those of greater specific gravity will sink in the liquid and those of lesser specific gravity will tend to rise toward its surface, introducing the mixture of particles into the liquid so supplied, causing the liquid containing the particles introduced into it to flow in a swiftly moving inclined stream having a length many times its width at such speed of movement as to be self cleansing to eliminate eddies and swirls, continuing the flow of the eddyless stream at the high rate of speed in a stream having a length many times its width to permit the said articles to rise and fall under gravitational influence and separating the stream at the end of its movement into streams of which one comprises the surface liquid and particles of lesser specific gravity carried by it, and another stream comprising the bottom portion of the stream and particles of greater specific gravity carried by it.

7. The method of separating a mixture of articles of different specific gravities into groups or grades having like specific gravities which consists in so supplying a transporting liquid having greater specific gravity than some of the articles and lesser specific gravity than the others, as to create a condition of turbulence, introducing the mixture of articles into the transporting liquid while turbulent so that bubbles adhering to the articles are washed off, causing the liquid containing the mixture of articles introduced into it to flow forward in an inclined stream having a length many times its width for a distance and at a velocity which will carry all of the articles to the lower end of the stream and will eliminate objectionable eddies from the stream and causing said liquid containing the mixture of articles to continue to flow in a stream having a length many times its width and thereafter permit the said articles to rise or fall under gravitational influences, and discharging the upper stratum of the liquid separately from the lower stratum of the liquid.

8. The method of grading peas, beans or the like, which comprises producing a swiftly moving sloping stream of liquid of a length many times its width introducing peas of mixed quality into the stream and carrying them forward therein at a self cleansing velocity for a distance sufficient to first eliminate eddies from said stream and thereafter continuing the flow of the stream having its length many times its width to permit the rising of the floaters and sinking of the others, subsequently dividing the stream into upper and lower portions to segregate the floaters and sinkers from each other and discharging the stream divisions carrying the separated materials.

9. In apparatus for separating articles of different specific gravity from a mixture of articles, bottom and side members arranged to form a continuous channel having an inlet at one end and an outlet at the other end, and so arranged that the bottom of the channel will be so inclined as to cause the contents of the channel to flow from its inlet end to its outlet end at a self cleansing velocity, said channel being of a length many times its width and so constructed as to produce a uniform flow in the major length of the channel sufficient to eliminate objectionable eddies from the stream therein and thereafter continue the flow of said stream at a self cleansing velocity, means for supplying liquid of greater specific gravity than some of the said articles to be graded and of less specific gravity than others to the inlet in a turbulent condition to create a continuous flow of liquid through the channel, means for introducing the articles into the turbulent liquid at the inlet of the channel, means at the outlet end of said channel to divide the flowing liquid into two or more superimposed streams of liquid, and means to separately discharge each of said streams.

10. In apparatus for separating articles of different specific gravity into grades a channel of a length many times its width and of such cross section and grade as will produce a self cleansing velocity of flow throughout its length and of such construction as will produce a uniform flow in the major length of the channel and serve to eliminate objectionable eddies from the stream therein and thereafter continue the flow of said stream at a self-cleansing velocity for a substantial distance, means at the upper end of the channel to so introduce a liquid as to produce a condition of turbulence therein said liquid being of greater specific gravity than some of the articles to be graded and of less specific gravity than others, means to introduce the articles to be graded into the liquid in advance of the uniform parallel flow of liquid in the major length of the channel, means at the lower end of the channel to divide the flowing liquid into two or more superimposed streams of liquid and means to separately discharge each of said streams.

11. In apparatus for grading articles with relation to their specific gravity, a container for liquid, means for introducing liquid and the articles to be graded into the container, said liquid being of greater specific gravity than some of the articles and of less specific gravity than that of others, said container including a sloping channel of a length many times its width leading from said container, adapted to carry off the liquid and the articles in the liquid at high velocity, said channel being of such length and construction as will produce a uniform flow in the major length of the channel and serve to eliminate objectionable eddies from the stream therein and thereafter continue the flow of said stream at a self cleansing velocity for a substantial distance, means at the lower end of the channel to divide the flowing liquid into two or more superimposed streams of liquid and means to separately discharge each of said streams.

12. An apparatus for separating articles of different specific gravity into grades from a mixture of articles, bottom and side members arranged to form a continuous elongated sloping channel having an inlet at one end and an outlet at the other end, means providing a continuous swift flow of a stream of liquid from the inlet end of said channel to the outlet end, said liquid having a greater specific gravity than some of said articles in said mixture and less than others and being propelled at a self cleansing velocity, means for introducing liquid, means for introducing the articles to be separated into said stream, means at the outlet end of said channel to divide the flowing liquid into two or more superimposed streams of liquid and articles, and means to separately discharge each of said superimposed streams, the length of said channel from its inlet end to said dividing means being many times its width and sufficiently great to first eliminate from said stream all objectionable eddies and swirls caused by the introduction of said stream of liquid and articles and to subsequently carry the articles to be separated forward in a stream flowing in horizontal strata a substantial distance before said stream encounters said dividing means whereby after leaving the turbulent portion of said stream each article rises or falls in said stream solely under gravitational influences and assumes the proper level determined by its specific gravity before encountering said dividing means.

13. In apparatus for separating articles into groups in accordance with their specific gravity, a channel laid on a grade which will produce a self cleansing velocity of liquid therein in all points from the inlet to the outlet end of the channel, means at the upper end of the channel for introducing liquid in sufficient volume and at such speed as to produce turbulence to maintain a flow throughout the channel and means for introducing the mixture of articles to be separated into the turbulent liquid at the upper end of the channel, the channel continuing for a length many times its width so as to smooth out the eddies and swirls caused by introducing the liquids and mixture of articles into the upper end of the channel and so produce liquid flowing in substantially horizontal strata, the channel being further continued for a length many times its width to allow time for the articles in the mixture to separate into floaters and sinkers, with means at the lower end of the channel for dividing the stream into two or more superimposed streams and discharging the same.

14. The method of separating granular particles into grades in accordance with the relation between their specific gravities and a transporting liquid which consists in placing said articles in a running stream of the transporting liquid, confining and passing said stream and contained particles along a sloping channel having a length many times its width at a high, self-cleansing velocity, continuing the flow of said stream at high velocity through the portion of said channel leading from the inlet until objectionable eddies and swirls caused by the introduction of said liquid and articles into said channel are eliminated, thereafter continuing the flow of said eddyless stream at high velocity through a subsequent portion of the channel until each article rises or falls in said stream under gravitational influence and assumes the proper level determined by its specific gravity and thereafter separating the stream into two separate streams, one comprising the surface liquid and particles of lesser specific gravity carried by it and another comprising the bottom portion of the stream and particles of greater specific gravity carried by it.

FREDERICK WALTER THOROLD.